United States Patent
Koseki

(10) Patent No.: US 8,239,630 B2
(45) Date of Patent: *Aug. 7, 2012

(54) STORAGE APPARATUS AND CACHE CONTROL METHOD

(75) Inventor: Hideyuki Koseki, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/151,454

(22) Filed: Jun. 2, 2011

(65) Prior Publication Data

US 2011/0231611 A1    Sep. 22, 2011

Related U.S. Application Data

(63) Continuation of application No. 12/331,697, filed on Dec. 10, 2008, now Pat. No. 7,979,639.

(30) Foreign Application Priority Data

Oct. 22, 2008    (JP) .................................. 2008-271508

(51) Int. Cl.
*G06F 12/02*    (2006.01)
*G06F 12/08*    (2006.01)

(52) U.S. Cl. ................. 711/118; 711/171; 711/E12.017

(58) Field of Classification Search .................. None
See application file for complete search history.

(56) References Cited

U.S. PATENT DOCUMENTS

| | | | |
|---|---|---|---|
| 6,745,212 | B2 | 6/2004 | Kishi et al. |
| 7,107,417 | B2 | 9/2006 | Gibble et al. |
| 7,356,660 | B2 | 4/2008 | Matsunami et al. |
| 7,702,851 | B2 | 4/2010 | Satoyama et al. |
| 2005/0091455 | A1 | 4/2005 | Kano et al. |
| 2005/0240724 | A1 | 10/2005 | Koizumi et al. |
| 2007/0239793 | A1 | 10/2007 | Tyrrell et al. |
| 2008/0104347 | A1 | 5/2008 | Iwamura et al. |
| 2008/0104443 | A1 | 5/2008 | Akutsu et al. |
| 2009/0240880 | A1 | 9/2009 | Kawaguchi |
| 2010/0100680 | A1 | 4/2010 | Koseki |

FOREIGN PATENT DOCUMENTS

| | | |
|---|---|---|
| JP | 200315915 | 1/2003 |
| JP | 2005309739 | 11/2005 |

*Primary Examiner* — Jasmine Song
*Assistant Examiner* — Daniel J Bernard
(74) *Attorney, Agent, or Firm* — Brundidge & Stanger, P.C.

(57) ABSTRACT

Optimizing cache-resident area where cache residence control in units of LUs is employed to a storage apparatus that virtualizes the capacity by acquiring only a cache area of a size that is the same as the physical capacity assigned to the LU. An LU is a logical space resident in cache memory is configured by a set of pages acquired by dividing a pool volume as a physical space created by using a plurality of storage devices in a predetermined size. When the LU to be resident in the cache memory is created, a capacity corresponding to the size of the LU is not initially acquired in the cache memory, a cache capacity that is the same as the physical capacity allocated to a new page is acquired in the cache memory each time when the page is newly allocated, and the new page is resident in the cache memory.

11 Claims, 13 Drawing Sheets

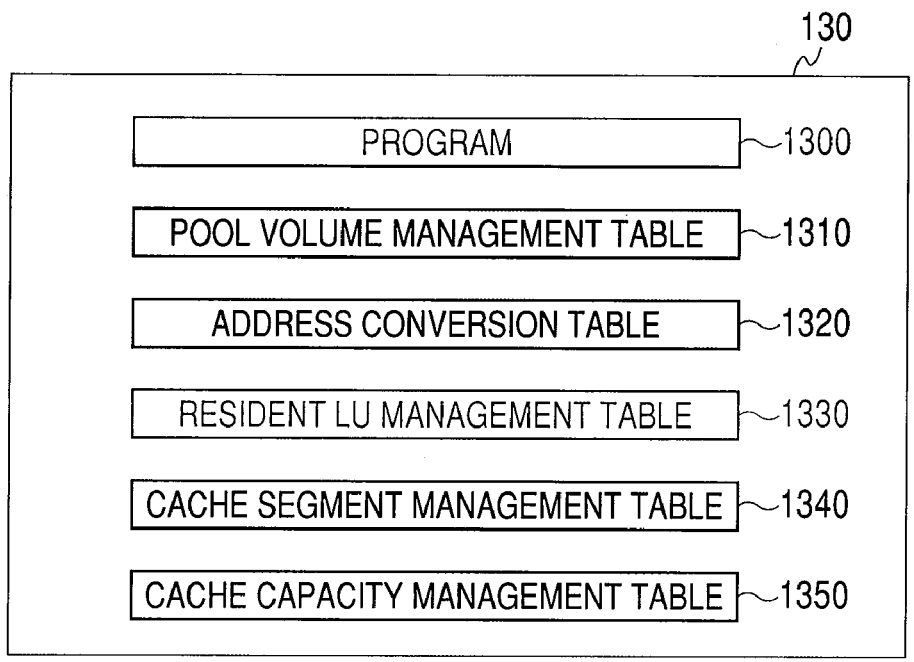

FIG. 5

Table 1320:

| LUN (13200) | START LBA (13201) | END LBA (13202) | PAGE NO. (13203) |
|---|---|---|---|
| 0 | 0 | 999 | 0 |
| | 1000 | 1999 | 1 |
| | 2000 | 2999 | 2 |
| | 3000 | 3999 | N/A |
| | 4000 | 4999 | N/A |
| 1 | 0 | 999 | 8 |
| 2 | 0 | 999 | 10 |
| ... | ... | ... | ... |

FIG. 6

Table 1330:

| LUN (13300) | LU SIZE (13301) |
|---|---|
| 0 | 10.00 GB |
| 3 | 45.50 GB |
| 20 | 2.25 GB |
| ... | ... |

| SEGMENT NO. 13400 | LUN 13401 | PAGE NO. 13402 | START LBA 13403 | END LBA 13404 | CACHE RESIDENCE FLAG 13405 |
|---|---|---|---|---|---|
| 0 | 0 | 0 | 0 | 31 | 1 |
| 1 | 1 | 4 | 6400 | 6431 | 0 |
| 2 | 0 | 0 | 32 | 63 | 1 |
| 3 | 2 | 7 | 39488 | 39519 | 0 |
| 4 | N/A | N/A | N/A | N/A | N/A |
| ... | ... | ... | ... | ... | ... |

FIG. 8

| USABLE CACHE SIZE | RESIDENT LU TOTAL SIZE | ALLOCATABLE CACHE SIZE |
|---|---|---|
| 200.00 GB | 80.00 GB | 120.00 GB |

STORAGE APPARATUS AND CACHE CONTROL METHOD

CROSS REFERENCES TO RELATED APPLICATIONS

The present application is a continuation of application Ser. No. 12/331,697, filed Dec. 10, 2008, now U.S. Pat. No. 7,979,639; which relates to and claims priority from Japanese Patent Application No. 2008-271508, filed on Oct. 22, 2008, the entire disclosure of which is incorporated herein by reference.

BACKGROUND OF THE INVENTION

The present invention relates to a storage apparatus that virtualizes the capacity, and more particularly, to technology that can be effectively applied to a cache control method in the storage apparatus.

DESCRIPTION OF THE RELATED ART

Generally, storage apparatuses that are configured by a plurality of disks use a RAID (Redundant Arrays of Independent Disks) configuration in which data is distributed and maintained over a plurality of disks for providing users a data storage space that has high capacity and high reliability and allows high-speed access.

When a storage apparatus is introduced, design of capacity, in which the capacity of a logical unit (LU) needed in the future is predicted in advance by a supervisor of the storage based on the operated form, is needed for creating the LU that is a storage space of user data. However, when the LU having an excessive size is allocated, there are problems such as low use efficiency of the physical capacity and an increase of TCO due to excessive investment.

Thus, as a technique for solving the above-described problems, a technique for providing a virtual LU space having an unlimited capacity for a host computer with only a minimal physical area adjusted to the access range of the LU used has been proposed (for example, JP-A-2003-15915). The above-described technique has an aspect that a physical area is not allocated at a time when the LU is created but a physical area is dynamically allocated from a group of disks to a part of the LU that is accessed each time the part is accessed.

In general storage apparatuses, a hard disk having a low-speed and high capacity is frequently used. Thus, in order to increase the speed of I/O processes, a cache memory (hereinafter, simply referred to as a cache) having a high speed and low capacity is loaded in the general storage apparatuses. However, since a cache memory area is much smaller than a disk area, it is difficult to continuously maintain specific data in the cache memory. Thus, a technique (hereinafter, referred to as cache residence) for implementing a high-speed process by intentionally having a specific program or specific data to be resident in the cache memory has been proposed (for example, JP-A-2005-309739).

In addition, although not written in JP-A-2005-309739, there is a technique for having data of all the specific LUs to be resident in the cache memory.

SUMMARY OF THE INVENTION

However, in the above-described storage apparatuses, when cache residence control is employed, data that is a residence target occupies a cache memory area that is needed for residence, and accordingly, a cache memory area that can be used by non-resident data is decreased. As a result, the speed of the I/O processes for the non cache-resident data is lowered.

Here, a case where the above-described LU cache residence control is applied to a storage apparatus that virtualizes the capacity will be considered. In the case, in the general residence method, in order to have all the data of the logical address space to be resident in the cache memory, an area corresponding to the total size of the virtualized LUs is needed to be acquired in the cache memory. In such a case, the cache area is acquired also for a part for which an I/O request is not generated and a physical area is not allocated, and accordingly, the cache area is unnecessarily occupied. Therefore, the use efficiency of the cache is lowered.

The object of the present invention is to provide a storage apparatus capable of optimizing the cache-resident area in a case where cache residence control in units of LUs is employed to a storage apparatus that virtualizes the capacity by acquiring only a cache area of a size that is the same as the physical capacity assigned to the LU. As a result, the cache area that can be used for non cache-resident data is increased, and the speed of the I/O processes for the non cache-resident data is improved, and accordingly, the system performance is maximized.

The above-described and other objects of the present invention and new aspects thereof will become apparent by referring to descriptions below and attached drawings.

Overviews of major embodiments of the invention disclosed here will be briefly described as below.

According to the overviews of the major embodiments, the above-described problems are solved by having only data corresponding to the amount of physical capacity assigned to the LU to be resident in the cache memory. In other words, a control method in which a segment area having a same size as that of assignment is acquired in the cache memory as a resident area each time when a physical capacity is newly allocated to the LU to be resident is used. In particular, in a case where an LU that is a logical space resident in the cache memory is configured by a set of pages acquired by dividing a pool volume as a physical space created by using a plurality of storage devices in a predetermined size, when the LU to be resident in the cache memory is created, a capacity corresponding to the size of the LU is not initially acquired in the cache memory, a cache capacity that is the same as the physical capacity allocated to a new page is acquired in the cache memory each time when the page is newly allocated, and the new page is resident in the cache memory.

In addition, for creating the resident LU, a control method in which the total size of the resident LUs is assured not to exceed the usable cache capacity is used. In particular, the allocation size of the LU desired to be resident and the allocatable cache size of the cache memory are compared with each other. When the allocation size of the LU is smaller than the allocable cache size, it is determined that the LU can be created. On the other hand, when the allocation size of the LU is larger than the allocatable cache size, it is determined that the LU cannot be created.

In addition, when the resident LU is deleted, a control method in which an LU that is not included in the residence target can use a cache open area by immediately opening the cache area acquired for residence is used. In particular, whether deletion of the resident LU or release of residence designation is determined. When deletion of the resident LU is determined, the page to be deleted is changed to be in the unassigned state, then, the entry of the target LU is deleted, and then, the resident area is open by changing the segment that maintains the data of the LU to be in the unused state. On the other hand, when release of the residence designation is determined, the data of the cache memory is reflected on the storage device by performing a data de-staging process for the data that has been restrained due to residence, then, the segment that maintains the data of the LU is changed to release of the residence designation, and information on the LU is deleted.

The advantages acquired from the major embodiments of the invention disclosed here will now be briefly described as below.

According to the advantages acquired from the major embodiments of the invention, unnecessary occupation of the cache for a case where the LU cache residence is performed in a storage apparatus that virtualizes the capacity can be suppressed. Accordingly, the use efficiency of the cache of the entire system is improved, and thereby a storage apparatus that maximizes the system performance can be implemented.

BRIEF DESCRIPTION OF THE DRAWINGS

FIG. 3 is a diagram representing the configuration of a memory of the storage apparatus represented in FIG. 1.

FIG. 4 is a diagram representing the configuration of a pool volume management table of the storage apparatus represented in FIG. 1.

FIG. 5 is a diagram representing the configuration of an address conversion table of the storage apparatus represented in FIG. 1.

FIG. 6 is a diagram representing the configuration of a resident LU management table of the storage apparatus represented in FIG. 1.

FIG. 7 is a diagram showing the configuration of a cache segment management table of the storage apparatus represented in FIG. 1.

FIG. 8 is a diagram representing the configuration of a cache capacity management table of the storage apparatus represented in FIG. 1.

DETAILED DESCRIPTION OF PREFERRED EMBODIMENT

Hereinafter, an embodiment of the present invention will be described in detail with reference to drawings. In all the drawings used for describing the embodiment, basically, a same reference sign is assigned to a same member, and a duplicate description thereof is omitted.

Configuration of Storage Apparatus

Figure 1:
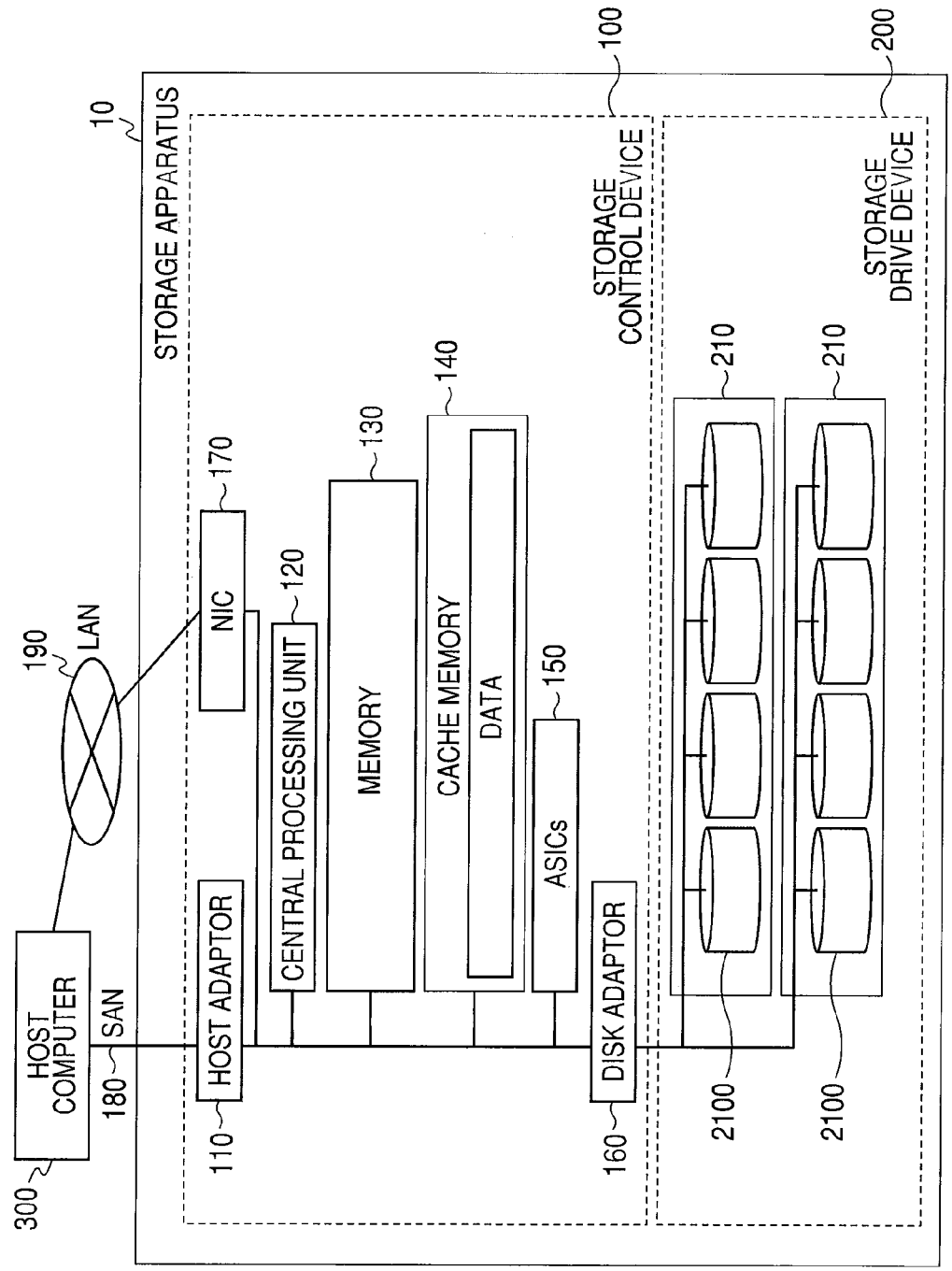
FIG. 1 is a diagram representing the whole configuration of a storage apparatus according to an embodiment of the present invention.

FIG. 1 is a diagram representing the whole configuration of a storage apparatus according to an embodiment of the present invention.

As shown in FIG. 1, the storage apparatus 10 is configured by a storage control device 100 that controls the overall operation of the storage apparatus and a storage drive device 200 that provides a storage area.

To the storage apparatus 10, a host computer 300 such as an application server that becomes an upper apparatus using the storage apparatus 10 is connected through a host adaptor 110 of the storage control device 100. As an interface for connecting the storage apparatus 10 and the host computer 300, a SAN (Storage Area Network) 180 that is a dedicated network is used. For the configuration of the SAN 180, a fiber channel, an SCSI (Small Computer System Interface), an iSCSI (internet Small Computer System Interface), a USB (Universal Serial Bus), an IEEE1394 bus, or the like may be used. In addition, there may be a plurality of the host computers 300 that are connected to the storage apparatus 10.

In addition, in the host computer 300, a control software program that manipulates or sets the disk configuration of the storage apparatus 10 and controls the operation of the storage apparatus 10 is installed. The operation of the storage apparatus 10 can be controlled by issuing a command or the like to the storage apparatus 10 by using the control software program installed in the host computer 300. Here, the storage control software program in the storage apparatus 10 and the host computer 300 transfer data therebetween through a LAN (Local Area Network) 190. A computer that manages and controls the storage apparatus 10 may be different from the host computer 300.

The storage control device 100 is configured by the host adaptor 110 that connects the storage control device 100 to the host computer 300 using the storage apparatus 10, a central processing unit (CPU) 120 that performs overall control of the storage apparatus 10, a memory 130 in which a program and data needed for the CPU 120 to control the storage apparatus 10 are stored, a cache memory 140 for user data that provides a high-speed response by having an LU for data access of the host computer 300 to be resident, ASICs (application specific integrated circuits) 150 that calculate parities for configuring an RAID and the like, a disk adaptor 160 that connects the storage control device 100 and the storage drive device 200, and an NIC (Network Interface Card) 170 that is connected to the host computer 300 through the LAN 190.

The storage drive device 200 includes a plurality of disk boxes 210. In the disk box 210, a plurality of physical disks (storage devices) 2100 are included. As the physical disk 2100, a hard disk or the like may be used.

<Configuration of LU>

Figure 2:
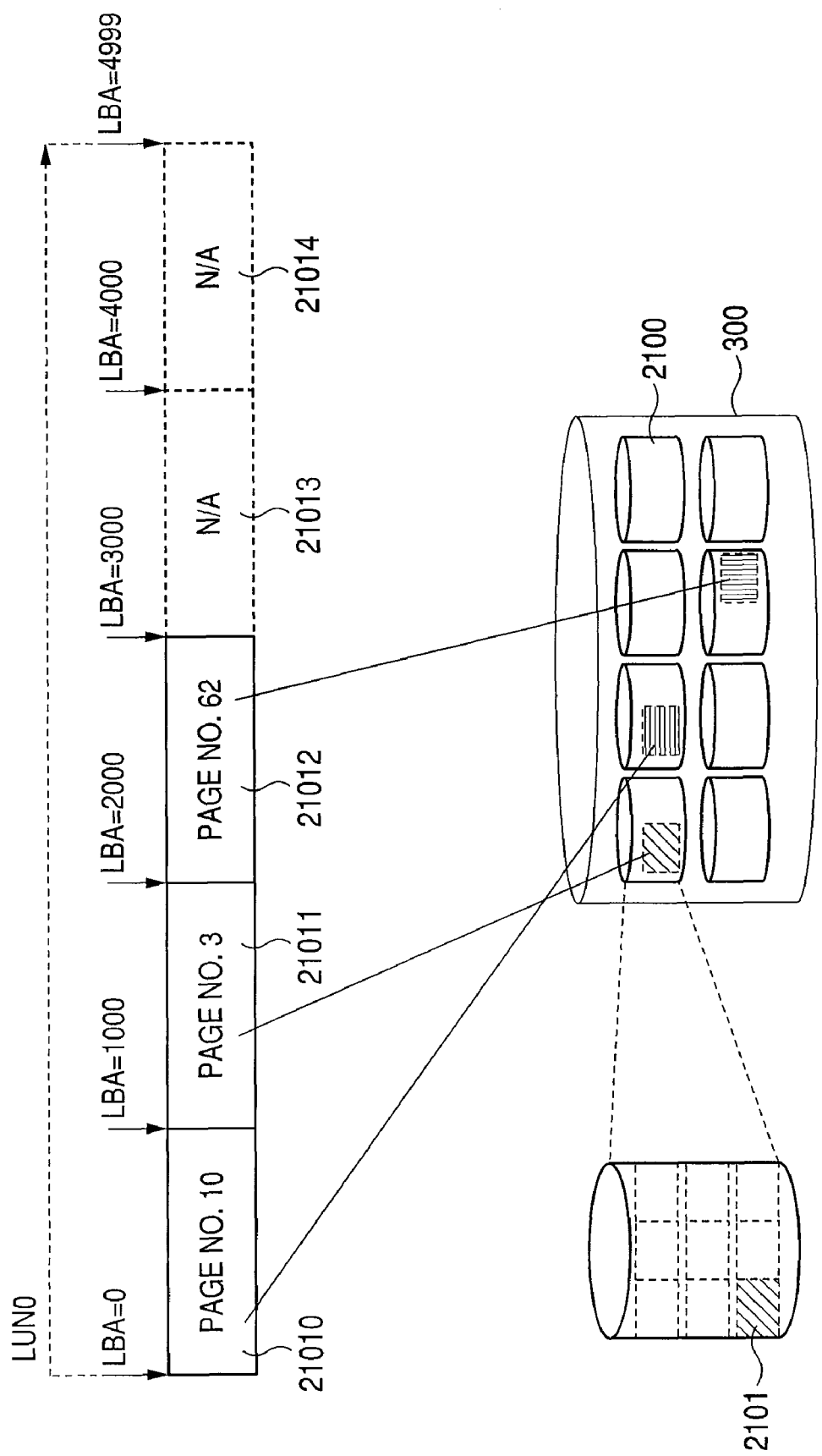
FIG. 2 is an explanatory diagram representing an overview of the configuration of an LU of the storage apparatus represented in FIG. 1.

FIG. 2 is an explanatory diagram representing an overview of the configuration of an LU.

In this embodiment, by using the plurality of physical disks 2100 that is included in the storage drive device 200, a pool volume that is a physical space having a specific RAID level is created. Then, a physical capacity needed for building an LU as a logical space is assigned from the pool volume. The pool volume is divided into a plurality of blocks (hereinafter, referred to as pages 2101) having a predetermined size. The LU is configured by a set of the pages 2101 in the pool volume. One page 2101 may be created over a plurality of the physical disks 2100.

In FIG. 2, LUN0 (the number of the LU is "0") represents an LU having the capacity of five pages. In the figure, to areas of three pages including page No. 10 (21010) of LBA (Logical Block Address)=0 to LBA=999, page No. 3 (21011) of LBA=1000 to LBA=1999, and page No. 62 (21012) of LBA=2000 to LBA=2999, assignment of physical capacities are completed. On the other hand, areas of two pages including a page (21013) of LBA=3000 to LBA=3999 and a page (21014) of LBA=4000 to LBA=4999 are in the state (N/A) in which any physical capacity is not assigned thereto. Thus, while the host computer 300 recognizes LUN0 as the area of LBA=0 to LBA=4999, the storage device 10 is in the state in which physical capacities are assigned only to the areas of LBA=0 to LBA=2999 to which actual access is made. Here, when access to each area of LBA=3000 to LBA=3999 or LBA=4000 to LBA=4999 as an area to which any physical capacity is not assigned is made, a new page is assigned to the LU by acquiring the new page from the pool volume.

<Configuration of Memory>

FIG. 3 is a diagram representing the configuration of the memory 130.

In the memory 130, a program 1300 that is used by the CPU 120 for controlling the storage apparatus 10, a pool volume management table 1310 that is used for managing the physical capacity, and an address conversion table 1320 that is used for managing correspondence between the pool volume as a physical space and the LU as a logical space, a resident LU management table 1330 that is used for managing a list of resident LUs and sizes of the LUs, a cache segment management table 1340 that is used for managing cache segments, and a cache capacity management table 1350 that is used for managing the cache capacity used by the resident LUs are stored. The tables 1310 to 1350 will be described later in detail with reference to FIGS. 4 to 8. In addition, in the program 1300, programs used for processes to be described with reference to FIGS. 9 to 15 are included.

<Configuration of Pool Volume Management Table>

FIG. 4 is a diagram representing the configuration of the pool volume management table 1310.

In the pool volume management table 1310, areas for a page No. 13100, an HDD No. 13101, a start address 13102, an end address 13103, and an assignment flag 13104 are included.

The page No. 13100 is an identifier of a page that is created in the pool volume, and a unique number is assigned thereto. The HDD No. 13101 is an identifier used for managing a hard disk (physical disk 2100) to which each page belongs. In FIG. 4, the hard disk number is denoted by "x-y". Here, x is a number representing the position of a disk box 210, and y is a number representing the position of the hard disk (physical disk 2100) in the same disk box 210. The start address 13102 and the end address 13103 represent the start position and end position of each page. The assignment flag 13104 is a flag used for determining whether assignment of a page to the LU is completed. When the assignment flag is "1", it represents completion of assignment of the page. On the other hand, when the assignment flag is "0", it represents that the page is unassigned.

<Configuration of Address Conversion Table>

FIG. 5 is a diagram representing the configuration of the address conversion table 1320.

In the address conversion table 1320, areas for an LUN 13200, a start LBA 13201, an end LBA 13202, and a page No. 13203 are included.

The LUN 13200 is an identifier of the LU. The start LBA 13201 and the end LBA 13202 represent the start position and the end position of the logical address. The page No. 13203 is used for managing correspondence between a logical address and a physical address. In the page No. 13203, the page No. of a page that is assigned from the pool volume is stored. Here, in the page No. 13203 of an area to which any physical capacity is unassigned, "N/A" is stored.

<Configuration of Resident LU Management Table>

FIG. 6 is a diagram representing the configuration of the resident LU management table 1330.

In the resident LU management table 1330, areas for an LUN 13300 and an LU size 13301 are included.

The LUN 13300 is the LU number of an LU that is designated to be resident. The LU size 13301 is the size of an LU that is assigned to each resident LU. Although the LU size is represented in GB in FIG. 6, the unit is not limited thereto. Thus, as the LU size, a MB notation, a KB notation, or the number of blocks may be used.

<Configuration of Cache Segment Management Table>

FIG. 7 is a diagram showing the configuration of the cache segment management table 1340.

In the cache segment management table 1340, there are areas for a segment No. 13400, a LUN 13401, a page No. 13402, a start LBA 13403, an end LBA 13404, and a cache residence flag 13405.

The segment No. 13400 is an identifier of a cache segment. The LUN 13401 represents the LUN of data that is stored in each segment. The page No. 13402 manages correspondence between data stored in the segment and a page of the pool volume. The start LBA 13403 and the end LBA 13404 manage the position within a corresponding page in which data stored in each segment is stored. When the size of the cache segment and the page size are different from each other, it is needed to determine the position within the page in which the data is stored.

The cache residence flag 13405 is used for managing whether data stored in the segment is designated to be cache-resident. When the cache residence flag 13405 is "1", it represents that the segment is a cache-residence target and the segment cannot be used for an LU that is not included in the residence target. On the other hand, when the cache residence flag 13405 is "0", it represents that the segment is not a cache-residence target and an ordinary LU that is not included in the residence target can use the segment. In addition, for an unused segment, "N/A" representing "not in use" is respectively stored in the LUN 13401, the page No. 13402, the start LBA 13403, the end LBA 13404, and the cache residence flag 13405 for representing that the segment can be immediately used.

<Configuration of Cache Capacity Management Table>

FIG. 8 is a diagram representing the configuration of the cache capacity management table 1350.

In the cache capacity management table 1350, areas for a usable cache size 13500, a resident LU total size 13501, and an allocatable cache size 13502 are included.

The usable cache size 13500 is the capacity of the cache memory 140 loaded in the storage apparatus 10 which can be used for maintaining user data. The value of the usable cache size changes in accordance with an increase or decrease of the capacity of the cache memory that is loaded in the storage apparatus 10. The resident LU total size 13501 manages the total LU size of the resident LUs. In the resident LU total size 13501, a value acquired from summing the LU sizes 13301 that are constituent elements of the resident LU management table 1330 is stored. In the allocatable cache size 13502, a value acquired from subtracting the resident LU total size 13501 from the usable cache size 13500 is stored. Since an LU having a size exceeding the physical capacity of the cache memory 140 that is loaded in the storage apparatus 10 cannot be resident, the allocatable cache size is used as a criterion for determining excess of the capacity. Although each size is represented in GB in FIG. 8, any unit such as MB, KB, or the number of blocks may be used.

<Creation of Resident LU>

Figure 9:
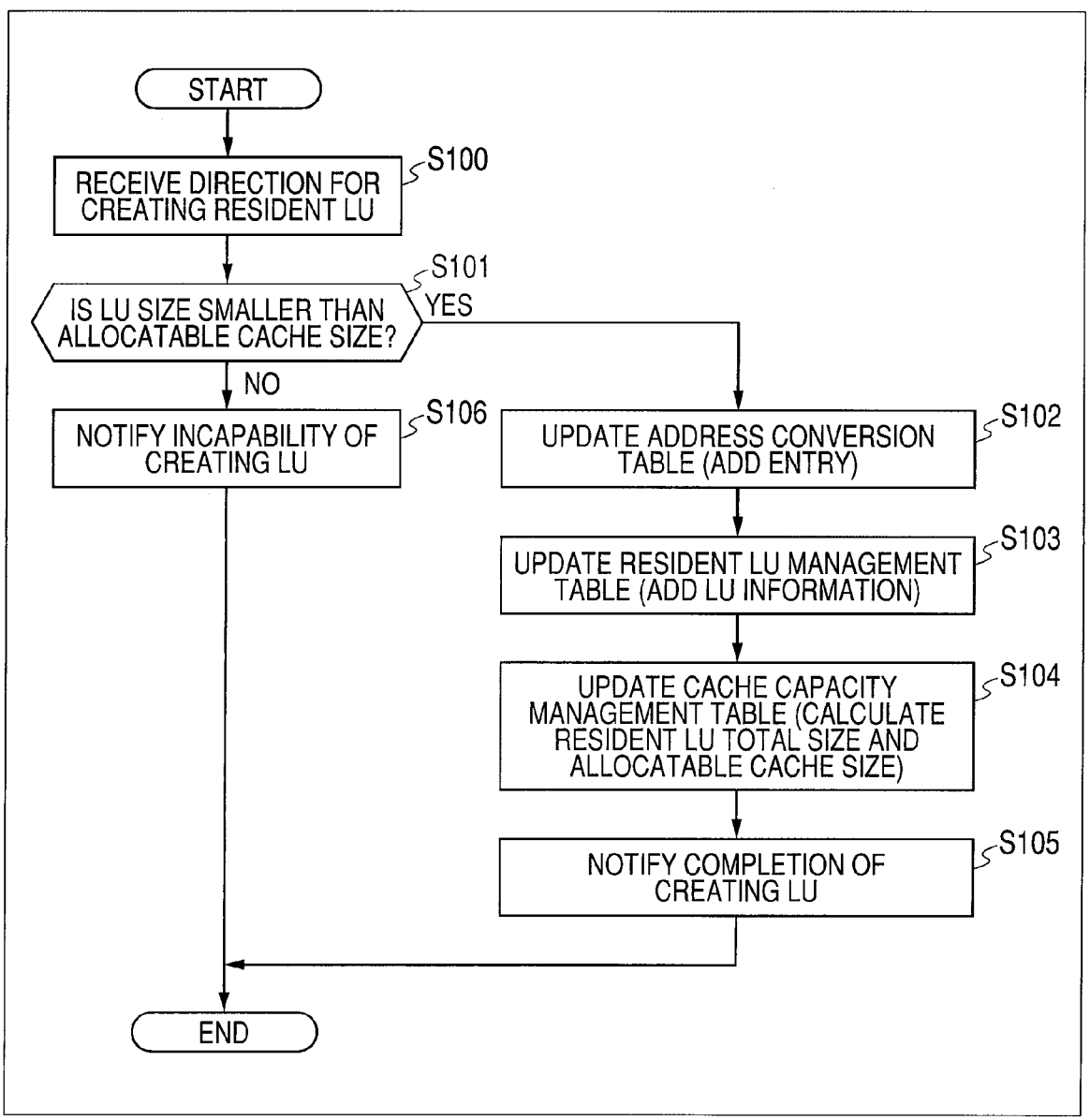
FIG. 9 is a flowchart representing the sequence of creation of a resident LU in the storage apparatus represented in FIG. 1.

FIG. 9 is a flowchart representing the sequence of creation of the resident LU. The sequence of creation of the resident LU will be described with reference to FIG. 9. The central processing unit 120 executes the program 1300 that is stored in the memory 130 in the storage apparatus 10 for performing the sequence of creation of the resident LU.

A storage manager directs the storage apparatus 10 to create the resident LU by using the control software that is installed to the host computer 300 (not shown in FIG. 9). Then, the storage apparatus 10 receives the direction for creating the resident LU which is issued by the host computer 300 (Step S100) and determines whether the allocation size of the LU desired by the storage manager is smaller than the allocatable cache size by comparing the desired allocation size of the LU with the allocatable cache size 13502 (Step S101). When the desired size of the LU is smaller than the allocatable cache size (S101—Yes) as the result of comparison, it is determined that the LU can be created. Accordingly, a process of creating the LU described below is performed.

First, an entry of an LU to be created is added in the address conversion table 1320. In particular, an LU number is added in the LUN 13200, the number of pages needed for creating the LU is calculated by dividing the LU size by the size of one page, and the start LBA 13201 and the end LBA 13202 of each page are written. However, in this process, only the process of allocating the LU capacity is performed, and allocation of a page that is an actual physical area is not performed. Thus, all the page No. 13203 in the address conversion table become "N/A" (Step S102). Next, by writing the LU number and the LU size of each LU to be created in the LUN 13300 and the LU size 13301 included in the resident LU management table 1330, the resident LU management table 1330 is updated (Step S103). In addition, the resident LU total size 13501 and the allocatable cache size 13502 in the cache capacity management table 1350 are updated (Step S104). Finally, by transmitting a notice of completion of creation of the LU to the host computer 300, this process is completed (Step S105).

On the other hand, when it is determined that the LU size is larger than the allocatable cache size in Step S101 (S101—No), all the sizes of the resident LUs exceed the usable cache size. Accordingly, it is determined that the LU cannot be created. Thus, by transmitting a notice of incapability of creation of the LU to the host computer 300, this process is completed (Step S106).

<I/O Request Processing>

Figure 10:
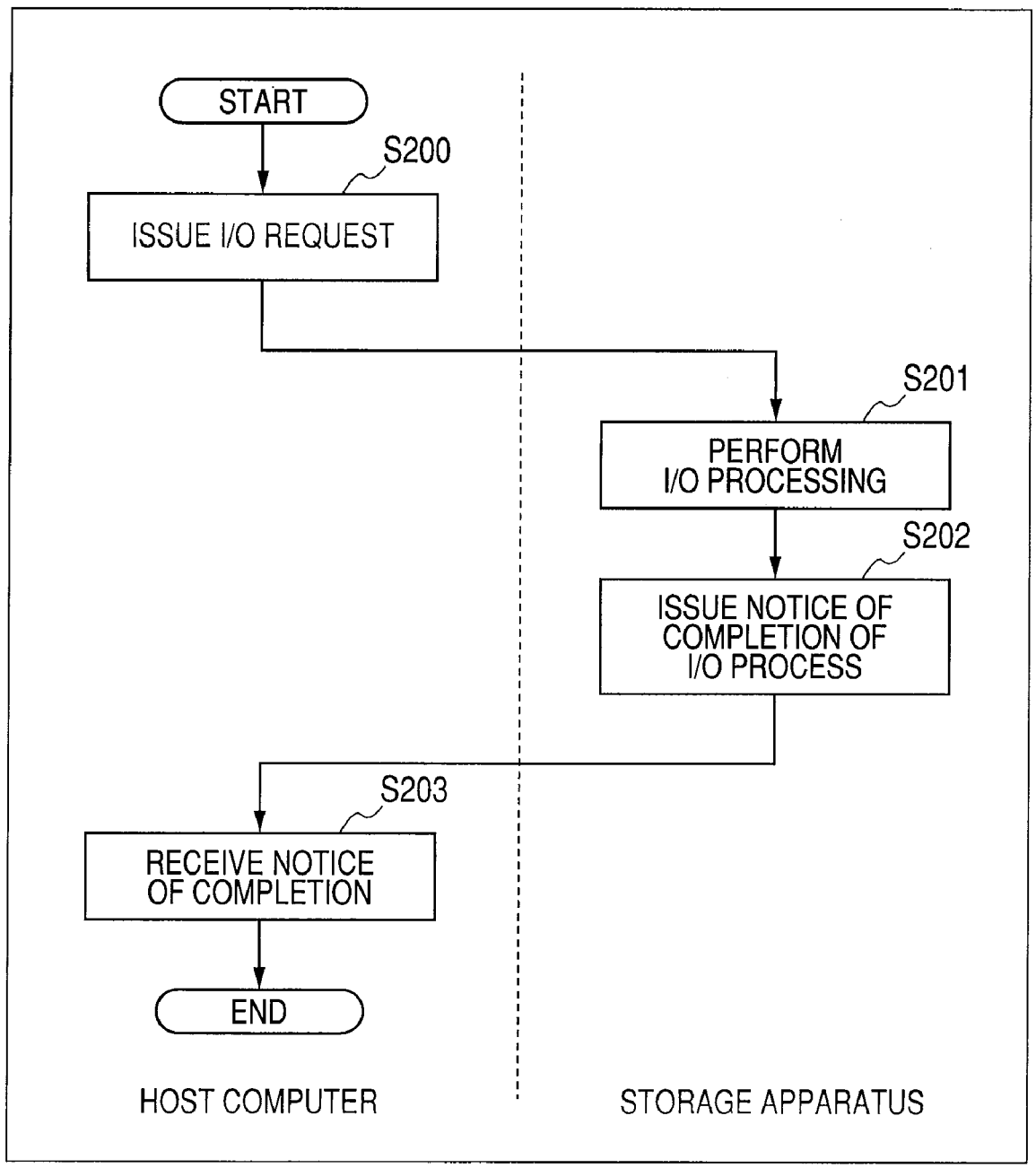
FIG. 10 is a flowchart representing the sequence of processing an I/O request transmitted from a host computer in the storage apparatus represented in FIG. 1.

FIG. 10 is a flowchart representing the sequence of processing an I/O request transmitted from the host computer 300. The sequence of processing an I/O request issued to the storage apparatus 10 by the host computer 300 will be described with reference to FIG. 10. The central processing unit 120 executes the program 1300 stored in the memory 130 in the storage apparatus 10 for performing the sequence of the I/O request processing.

The host computer 300 issues an I/O request of read or write to the storage apparatus 10 (Step S200). Then, the storage apparatus 10 receives the I/O request from the host computer 300 and performs an I/O process (Step S201). The I/O process will be described later in detail with reference to FIG. 11. After completing the process of Step S201, the storage apparatus 10 issues a notice of completion of the I/O request to the host computer 300 for notifying completion of the requested I/O process (Step S202). Then, the host computer 300 receives the notice of completion from the storage apparatus 10 and completes the command (Step S203).

Figure 11:
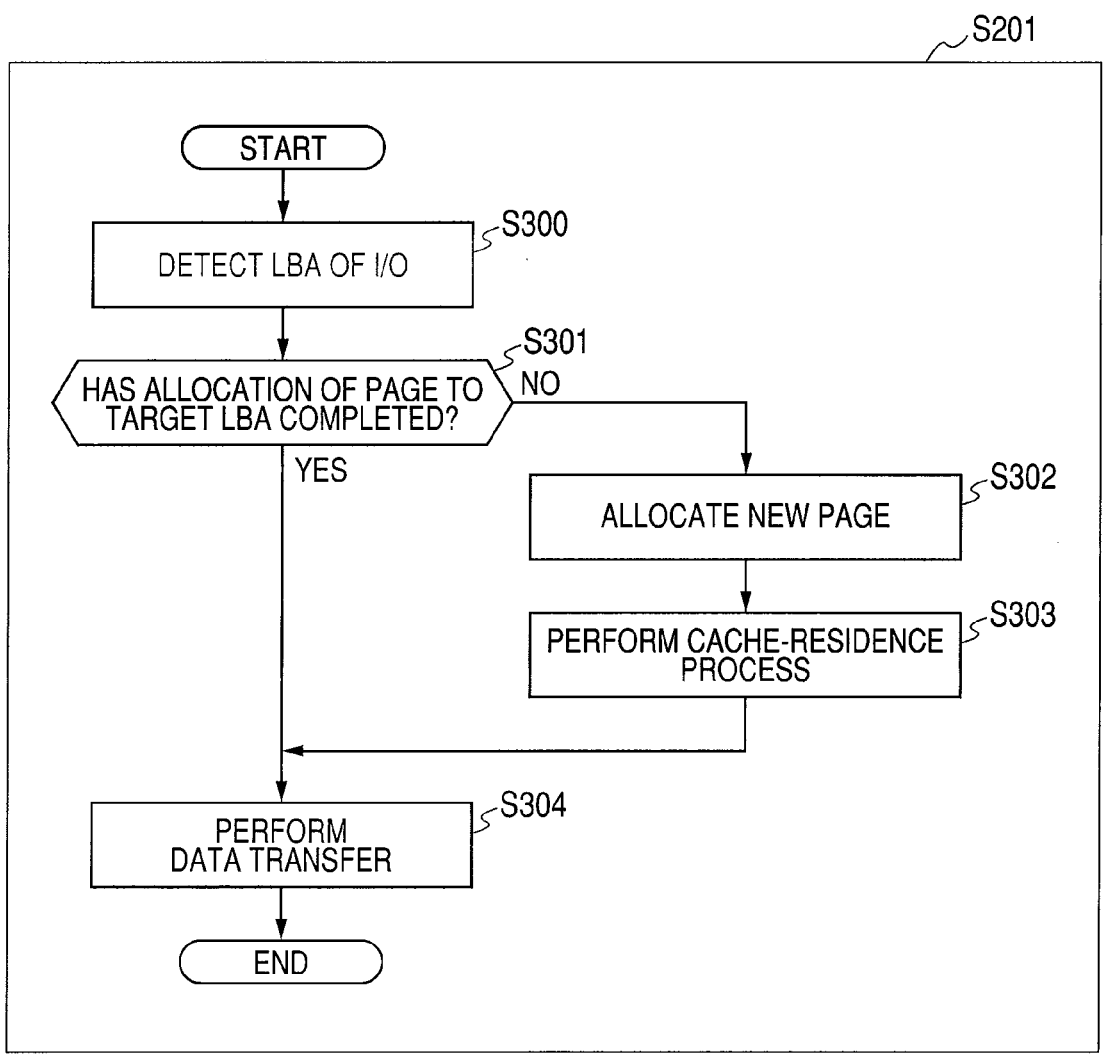
FIG. 11 is a flowchart representing a detailed sequence of an I/O process performed by the storage apparatus represented in FIG. 1.

FIG. 11 is a flowchart representing a detailed sequence of Step S201 that is the I/O process performed by the storage apparatus 10.

The storage apparatus 10 analyzes the I/O request command and detects an LUN, a start LBA, and an end LBA to be processed (Step S300). Next, the storage apparatus determines whether assignment of a page to the target LBA has been completed based on information included in the address conversion table 1320 (Step S301). When the page No. 13203 corresponding to the target LBA is not N/A (S301—Yes) as the result of determination in Step S301, the storage apparatus determines the I/O request command as an I/O request for an area to which assignment of a page has been completed, and thus, the process proceeds to a data transfer process (Step S304). The data transfer process will be described later in detail with reference to FIG. 14.

On the other hand, when the page No. 13203 corresponding to the target LBA is N/A in Step S301 (S301—No), the I/O request is for an area to which a page is not assigned. Thus, allocation of a new page is determined to be needed, and the process proceeds to a new-page allocating process (Step S302). This new-page allocating process will be described later in detail with reference to FIG. 12. Thereafter, a cache-residence process for the newly allocated page is performed (Step S303). This cache-residence process will be described later in detail with reference to FIG. 13. Thereafter, the process proceeds to the data transfer process (Step S304).

Figure 12:
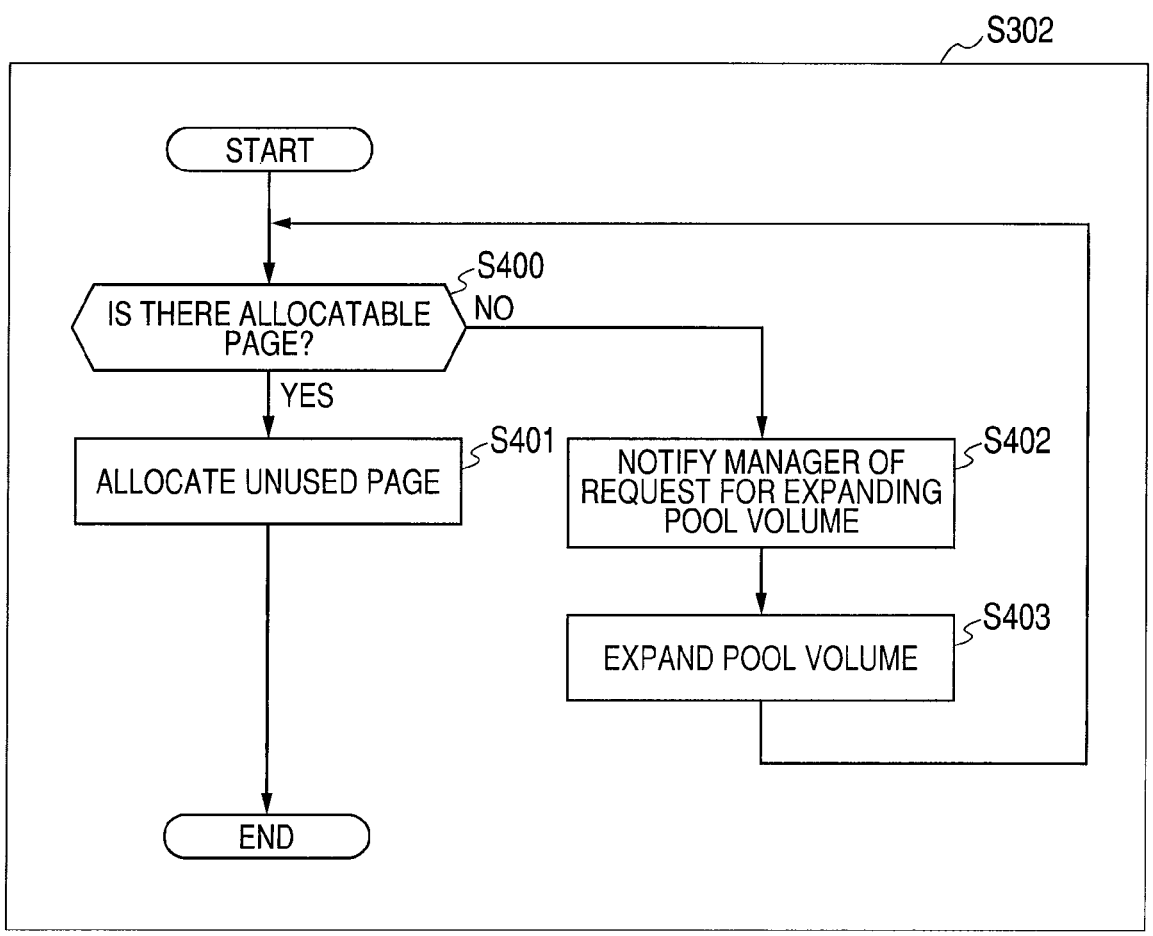
FIG. 12 is a flowchart representing a detailed sequence of a new-page allocating process in the storage apparatus represented in FIG. 1.

FIG. 12 is a flowchart representing a detailed sequence of Step S302 that is the new-page allocating process.

First, it is detected whether there is any allocatable page, that is, there is any unassigned page in the pool volume, based on information of the allocation flag 13104 included in the pool volume management table 1310 (Step S400). When there is not any page of which allocation flag 13104 is "0" in Step S400 (S400—No), it is determined that there is not any allocatable page. Accordingly, in such a case, a request for expanding the pool volume is transmitted to the storage manager by using the software installed in the host computer 300 (Step S402). Then, the storage manager that has received the notice of the request for expanding the pool volume in Step S402 adds a new physical disk 2100 to the pool volume for performing expansion of the pool volume (Step S403). By performing the pool volume expanding process, the entry of the pool volume management table 1310 is expanded by the amount of the added disk. The values of all the allocation flags 13104 of pages belonging to the added disk are in the state of "0"s representing that the pages are not assigned. After completing the expansion process of Step S403, the process proceeds to Step S400 in which whether allocation of a new page is determined again.

On the other hand, when there is a page of which allocation flag 13104 is "0" in Step S400 (S400—Yes), it is determined that there is an allocatable page. Accordingly, in such a case, a process of allocating the page is performed (Step S401). In particular, the page No. 13203 included in the address conversion table 1320 is changed from N/A to the page No. of the allocated page, and the allocation flag 13104 corresponding to the page No. 13100 of the allocated page included in the pool volume management table 1310 is changed to "1".

Figure 13:
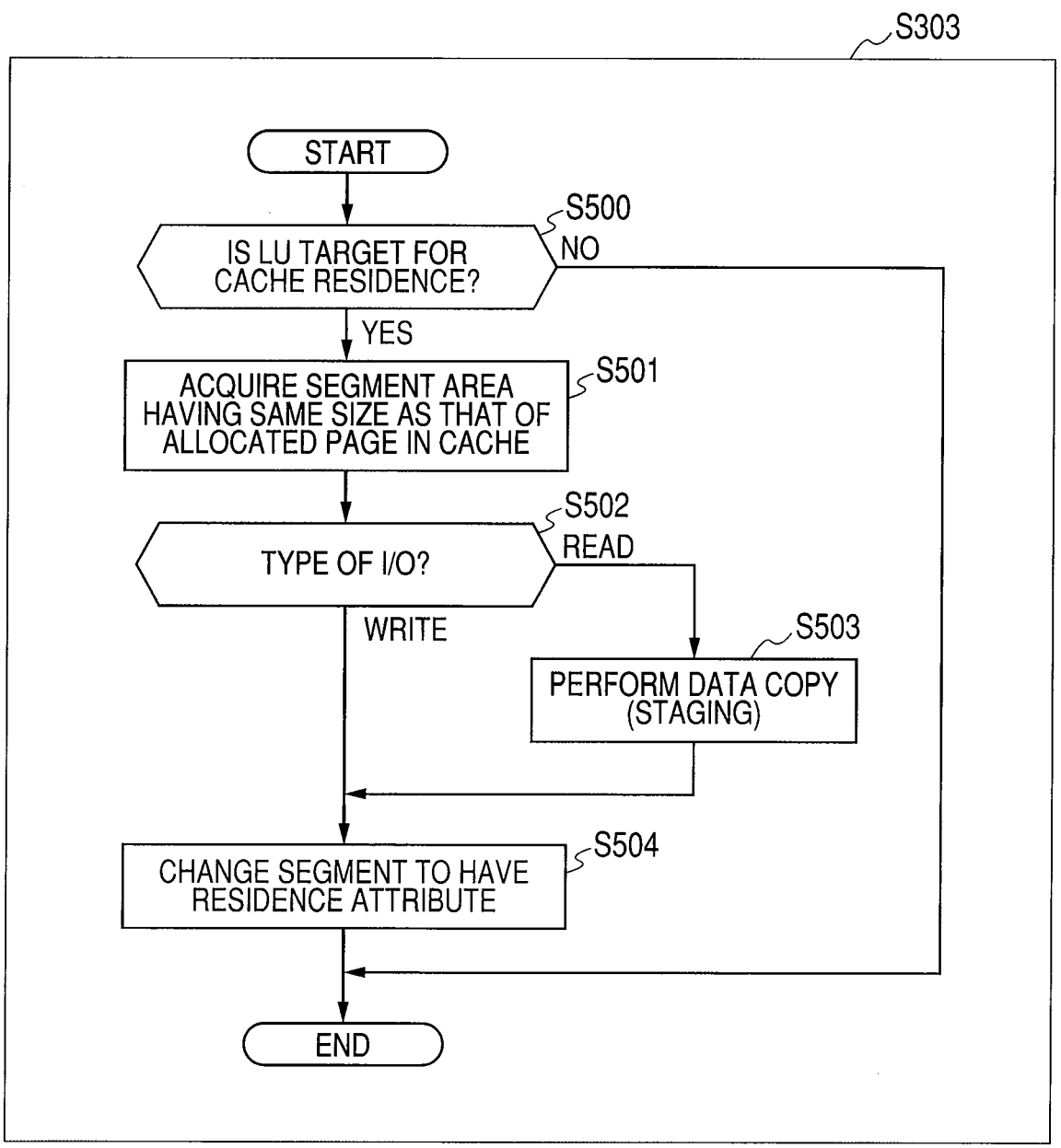
FIG. 13 is a flowchart representing a detailed sequence of a cache-residence process in the storage apparatus represented in FIG. 1.

FIG. 13 is a flowchart representing a detailed sequence of Step S303 that is the cache-residence process.

First, whether the LU is a cache-residence target is determined based on information included in the resident LU management table 1330 (Step S500). When the LUN of the LU to be processed is written in the LUN 13300 included in the resident LU management table 1330 (S500—Yes), it is determined that the LU is a cache-residence target. Accordingly, in such a case, in order to have data of the page allocated in Step S302 to be resident in the cache memory 140, a segment area corresponding to the amount of the allocated page is acquired in the cache memory 140 (Step S501). In Step S501, the LUN 13401, the page No. 13402, the start LBA 13403, the end LBA 13404 corresponding to the segment No. 13400 of the acquired segment which are included in the cache segment management table 1340 are updated.

Next, the I/O type of the command is determined (Step S502). When the I/O type is determined to be a read command (S502—Read), in order to cache-hit data, a data copying (staging) process for reading out data of the physical disk 2100 to be in the cache memory 140 is performed (Step S503). When the I/O type is determined to be a write command in Step S502 (S502—Write), acquisition of the cache memory area that is used for writing data is completed in S501, and accordingly, no process is performed. Next, by setting "1" that representing the cache-residence target to the value of the cache residence flag 13405, the segment is changed to have a residence attribute (Step S504). By performing the above-described steps, acquisition of the cache area corresponding to the amount of the newly allocated physical area only is completed for the residence target LU.

On the other hand, when the LU is determined not to be a residence target (S500—No) as the result of determination performed in Step S500, the process ends.

Figure 14:
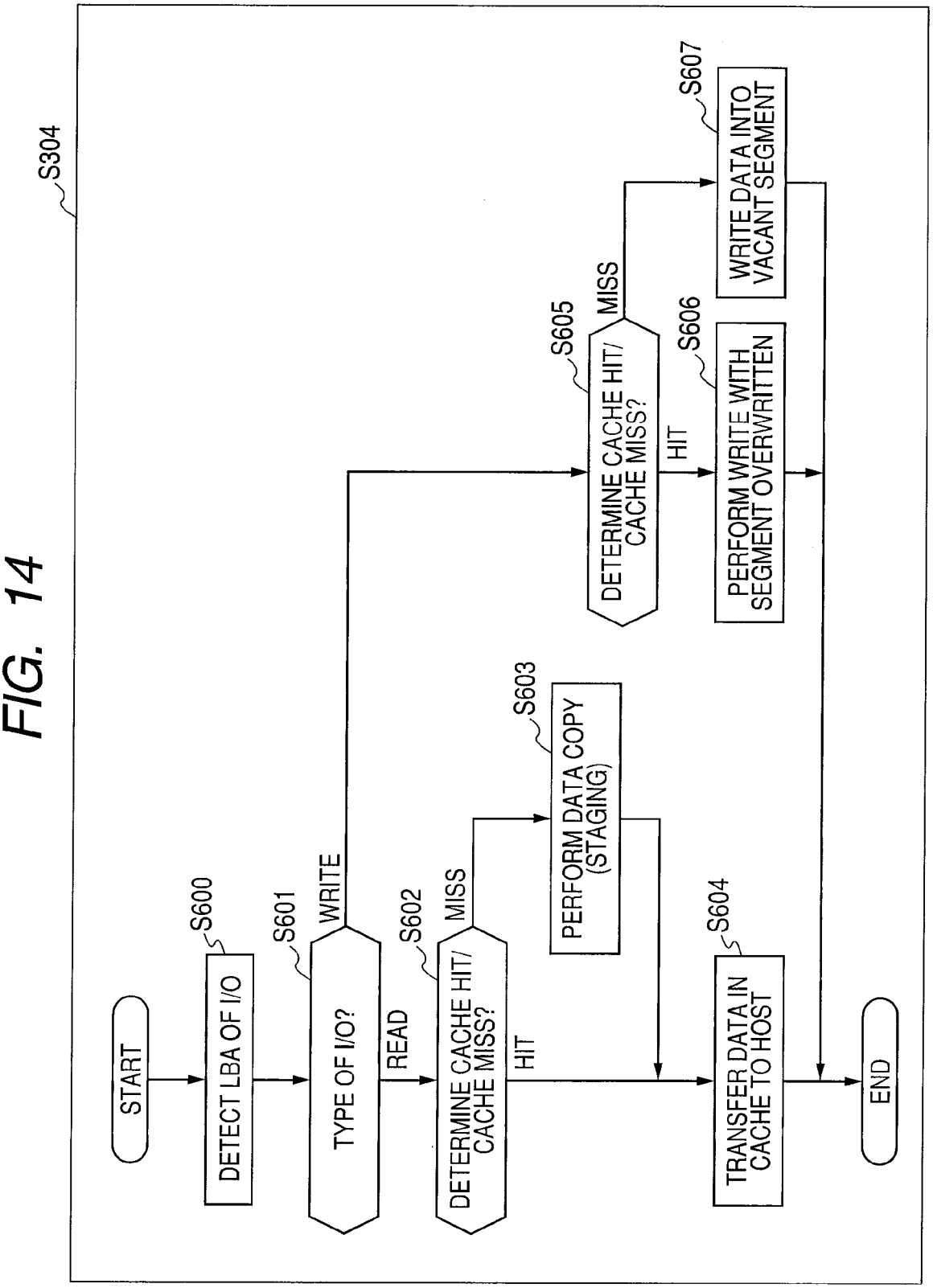
FIG. 14 is a flowchart representing a detailed sequence of a data transfer process in the storage apparatus represented in FIG. 1.

FIG. 14 is a flowchart representing a detailed sequence of Step S304 that is the data transfer process.

As in Step S300, the I/O request command is analyzed, and the LUN, the start LBA, and the end LBA to be processed are detected (Step S600). Next, by analyzing the I/O type, it is determined whether the command is a read command or a write command (Step S601). When the command is determined to be a read command (S601—Read) as the result of determination, cache hit or cache miss is determined based on the information included in the cache segment management table 1340 (Step S602). When data to be processed is not included in the cache segment management table 1340 (S602—miss), cache-miss is determined, and accordingly, copying (staging) data into the cache memory 140 from the physical disk 2100 is performed (Step S603). Thereafter, the data staged on the cache memory 140 is transferred to the host computer 300 (Step S604), and the process ends. On the other hand, when cache hit is determined in Step S602 (S602—hit), the data to be processed that is included in the cache memory 140 is transferred to the host computer 300 (Step S604), and the process ends.

On the other hand, When the I/O type is determined to be a write command in Step S601 (S601—Write), cache hit or cache miss is determined based on the information included in the cache segment management table 1340 as in Step S602 (Step S605). When data to be processed is included in the cache segment management table 1340 (S605—hit), cache-hit is determined, and accordingly, data is overwritten into the segment (Step S606), and the process ends. On the other hand, when cache miss is determined in Step S605 (S605—miss), the data is written into a vacant segment of the cache memory 140 (Sep S607), and the process ends.

Here, the data written into the cache memory 140 is needed to be overwritten into the physical disk 2100. A general storage apparatus employs an asynchronous write process in which a completion response is transmitted to the host computer 300 at a time point when the data is stored in the cache memory 140 and thereafter the data is written into the physical disk 2100 at an arbitrary timing. In FIG. 14, although the flowchart represents the process until completion of cache write only, it is assumed that the disk write process is performed asynchronously. However, the write data that is a cache-residence target is not written into the physical disk 2100.

In addition, in Steps S602 and S605 in which cache hit or cache miss is determined, cache hit is determined for the LU that is a cache-residence target, naturally.

Deletion of Resident LU or Release of Residence Designation

Figure 15:
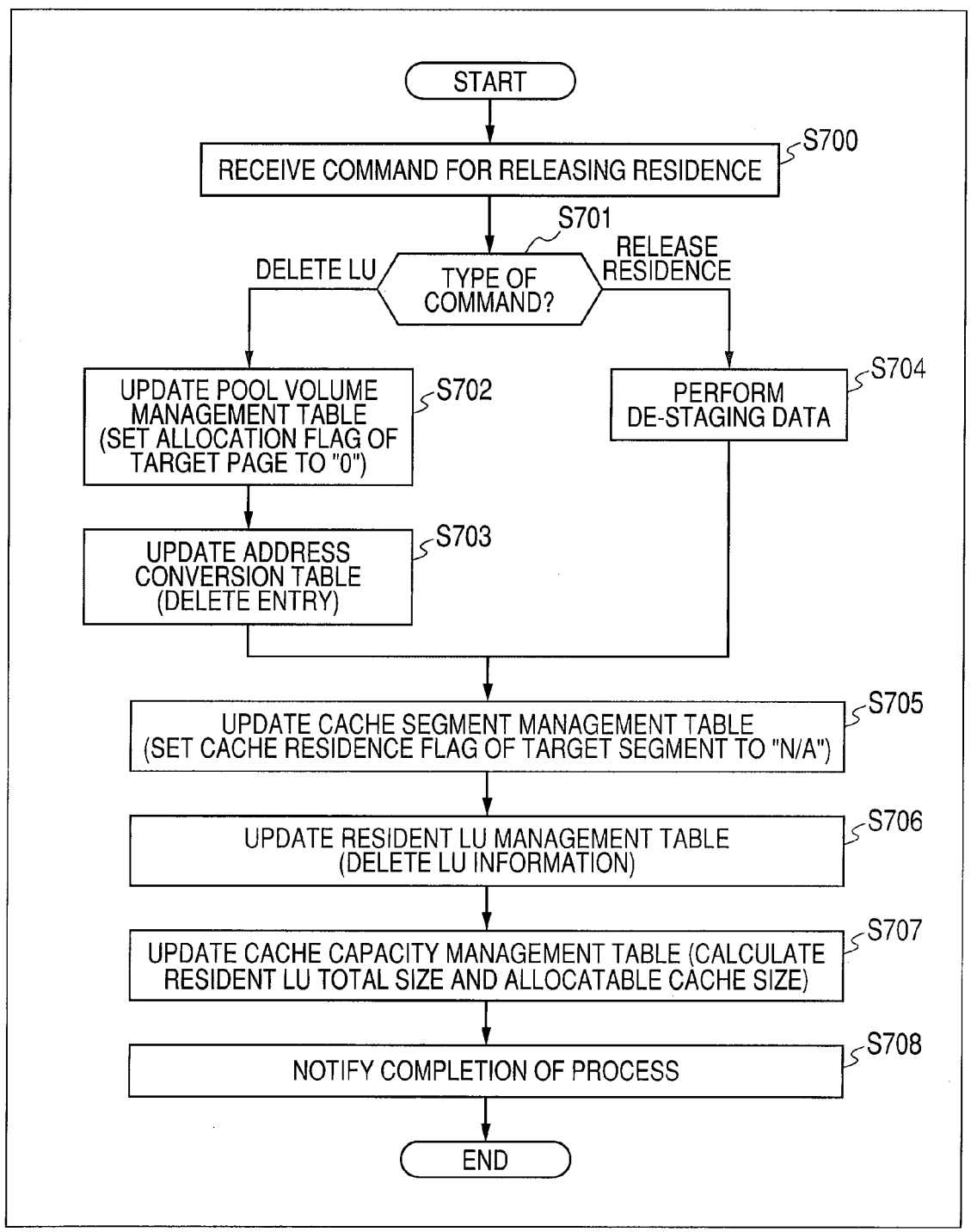
FIG. 15 is a flowchart representing the sequence for deleting a resident LU or releasing designation of residence in the storage apparatus represented in FIG. 1.

FIG. 15 is a flowchart representing the sequence for deleting a resident LU or releasing designation of residence. The central processing unit 120 executes the program 1300 stored in the memory 130 in the storage apparatus 10 for performing the sequence for deleting a resident LU or releasing designation of residence.

Here, release of residence designation represents an operation in which the LU is not deleted and the cache-residence of the LU is released.

First, the storage manager directs the storage apparatus 10 to delete a resident LU or release of residence designation by using the control software that is installed in the host computer 300 (not written in FIG. 15). Then, the storage apparatus 10 receives a command for directing the release of residence which is issued by the host computer 300 (Step S700). Then, the storage apparatus determines whether the type of the command is for deletion of the resident LU or only release of residence designation (Step S701).

When the command is for deletion of the LU as the result of Step S701 (S701—LU deletion), the allocation flag 13104 of the page No. 13100 that is to be deleted from the pool volume management table 1310 is changed to "0" that represents that the page is not assigned based on the page No. 13203 used by the LU that is to be deleted based on the information included in the address conversion table 1320 (Step S702). Next, by deleting the LUN 13200, the start LBA 13201, the end LBA 13202, and the page No 13203 corresponding thereto from the address conversion table 1320, the entry of the target LU is deleted (Step S703).

Thereafter, the segment No. 13400 in which data of the LU is maintained in the cache segment management table 1340 is acquired based on the LUN 13401, and the resident area is open by storing N/A, which represents "not in use" in the LUN 13401, the page No. 13402, the start LBA 13403, the end LBA 13404, and the cache residence flag 13405 of the segment (Step S705). In addition, the information on the LU is deleted from the resident LU management table 1330 (Step S706), and the resident LU total size 13501 and the allocatable cache size 13502 included in the cache capacity management table 1350 are updated (Step S707). By performing the above-described process, the process for deleting the resident LU is completed, and finally, this process is completed by transmitting a notice of completion of the process to the host computer 300 (Step S708).

On the other hand, when the command is for releasing the residence designation (S701—residence release) as the result of determination in Step S701, a data de-staging (data writing from the cache to the disk) process for the data that has been restrained due to residence is performed, and the data of the cache memory 140 is reflected on the physical disc 2100 (Step S704). Thereafter, the tables are updated by performing the processes of Step S705 to Step S707. However, in the update process for the cache segment management table 1340 of Step S705, different from the operation for deleting the LU, only the cache residence flag 13405 of the segment No. 13400 is changed to "0" that indicates release of the residence designation, and the LUN 13401, the page No. 13402, the start LBA 13403, and the end LBA 13404 are not changed. The reason is that although the segment is gradually used by a non-resident LU after release of the residence designation, there is a possibility of cache hit before the segment is used by the non-resident LU. Finally, the process is completed by transmitting a notice of completion of the process to the host computer 300 (Step S708).

By performing the above-described process, the open area can be used by an LU that is not designated to be resident by immediately opening the occupied area acquired in the cache memory 140 simultaneously with the release process in releasing the residence designation.

Advantages of This Embodiment (1) When an LU to be resident in the cache memory 140 is created, the capacity corresponding to the amount of the LU size is not initially acquired in the cache memory 140, and acquisition of the capacity is determined each time when the physical capacity is newly allocated to the LU to be resident. Accordingly, a segment area having the same size as the amount of allocation can be acquired in the cache memory 140 as a resident area.

(2) When the resident LU is created, residence is determined by comparing the allocation size of an LU desired to be resident and the allocatable cache size in the cache memory 140. Accordingly, it can be assured that the resident LU total size does not exceed the usable cache capacity.

(3) When a resident LU is deleted, an LU that is not included in the residence target can use a cache open area by deleting the entry of the LU to be deleted and immediately opening the cache area acquired for residence. In addition, when the residence designation is released, information on the LU is deleted by performing a data de-staging process for the data that has been restrained due to residence, and accordingly, the residence designation can be released.

(4) When cache residence of an LU is performed, unnecessary acquisition of a resident cache area can be suppressed. Accordingly, the cache area that can be used for data that is not cache-resident is increased, and the speed of the I/O process for data that is not cache-resident is improved, and thereby the system performance is maximized. Therefore, the use efficiency of cache of the entire storage apparatus is improved, and improvement of performance of the entire storage apparatus can be implemented.

As above, the invention contrived by the inventors has been described in detail based on the embodiment. However, the invention is not limited to the above-described embodiment, and it is apparent that the invention may be changed in various manners without departing from the gist of the invention.

What is claimed is:

1. A storage apparatus comprising:
a storage control device that contains a cache memory, the cache memory having a plurality of cache segments;
storage drive devices connected to the storage control device;
a storage pool volume provided by the storage drive devices, the storage pool volume being divided into a plurality of pages; and
a logical unit (LU) provided to a host computer, to which pages are assigned from the storage pool volume, the LU being a target to be resident in the cache memory,
wherein, in response to receiving from the host computer an Input/Output (IO) request to the LU addressing an area where a page has not been assigned, the storage control device is configured to assign a page to the LU from the storage pool volume, reserve one or more of the cache segments with the same size as the assigned page, and not assign the reserved cache segments to any other LU's.

2. The storage apparatus according to claim 1, wherein each size of the cache segments is different from that of the page,
wherein the storage control device has a cache segment management table which includes a plurality of records, each of the records being for one of the cache segments, the segment in any one of the records being different from that in the other of the records, each of the records having start and end addresses of data stored in the cache segment, the addresses identifying a location of the data in the assigned page.

3. The storage apparatus according to claim 2, wherein, in response to receiving a request for deleting the LU, the storage control device is configured to release the cache segments.

4. The storage apparatus according to claim 2, wherein, in response to receiving a request for changing status of the LU to not a target to be resident in the cache memory, the storage control device is configured to maintain data stored in the cache segments until the cache segments are assigned to any other LUs.

5. A storage apparatus comprising:
a storage control device that contains a cache memory, the cache memory having a plurality of cache segments;
storage drive devices connected to the storage control device;
a storage pool volume provided by the storage drive devices, the storage pool volume being divided into a plurality of pages; and
a logical unit (LU) provided to a host computer, to which pages are assigned from the storage pool volume, the LU being a target to be resident in the cache memory,
wherein, in response to receiving from the host computer an Input/Output (IO) request to the LU addressing an area where a page has not been assigned, the storage control device is configured to assign a page to the LU from the storage pool volume, reserve one or more of the cache segments with the same size as the assigned page, and not assign the reserved cache segments to any other LU's,
wherein the storage control device has a cache segment management table which includes a plurality of records, each of the records being for one of the cache segments, the segment in any one of the records being different from that in the other of the records, each of the records having start and end addresses of data stored in the cache segment, the addresses identifying a location of the data in the assigned page, and
wherein each of the records has identification information for the LU, identification information for the assigned page, and flag information indicating status of the cache segment, the status indicating any of a status including resident, not resident, or not used.

6. The storage apparatus according to claim 5, wherein, in response to receiving a request for deleting the LU, the storage control device is configured to change the flag information for all of the cache segments used for the LU from resident to not used, and release the cache segments.

7. The storage apparatus according to claim 5, wherein, in response to receiving a request for changing status of the LU to not a target to be resident in the cache memory, the storage control device is configured to change the flag information for all of the cache segments used for the LU from resident to not resident, and maintain data stored in the cache segments until the cache segments are assigned to any other LUs.

8. A cache allocation method comprising:
provide a plurality of cache segments in a cache memory of a storage control device;
providing at storage devices a storage pool volume, which is divided into a plurality of pages;
providing a logical unit (LU) to a host computer to which pages are assigned from the storage pool volume; and
in response to receiving from the host computer an Input/Output (I/O) request to the LU addressing an area where a page has not been assigned performing I/O processing,
wherein the I/O processing includes:
assigning a page to the LU from the storage pool,
reserving one or more of the cache segments with the same size as the assigned page if the LU is a target to be resident in the cache memory, and
changing status for the reserved cache segments in a cache segment management table of the storage control device to resident.

9. The cache allocation method according to claim 8, wherein each size of the cache segments is different from that of the page, the method further comprising a step of:
writing into each of records for one of the reserved cache segments in the cache segment management table, start and end addresses of data stored in the cache segment, the addresses identifying a location of the data in the assigned page.

10. The method according to claim 8, further comprising the step of:
in response to receiving a request for deleting the LU, changing status for the cache segments used for the LU from resident to not used, and releasing the cache segments for any other LUs.

11. The method according to claim 8, comprising the step of:
in response to receiving a request for changing status of the LU to not a target to be resident in the cache memory, changing status for the cache segments used for the LU from resident to not resident, and maintaining data stored in the cache segments until the cache segments is assigned to any other LUs.

* * * * *